(12) United States Patent
Saunders et al.

(10) Patent No.: US 9,590,373 B2
(45) Date of Patent: Mar. 7, 2017

(54) PROVIDING ORIENTATION SUPPORT IN RECEPTACLES

(71) Applicant: Intel Corporation, Santa Clara, CA (US)

(72) Inventors: Bradley Saunders, Portland, OR (US); Robert Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 954 days.

(21) Appl. No.: 13/680,639

(22) Filed: Nov. 19, 2012

(65) Prior Publication Data

US 2014/0141635 A1  May 22, 2014

(51) Int. Cl.
*H05K 7/14* (2006.01)
*H01R 29/00* (2006.01)
*G06F 13/40* (2006.01)

(52) U.S. Cl.
CPC ......... *H01R 29/00* (2013.01); *G06F 13/4068* (2013.01)

(58) Field of Classification Search
CPC  H01R 12/515; H01R 13/622; H01R 13/6683; H01R 2103/00; H01R 2107/00; H01R 24/30; H01R 24/42; H01R 4/4818
USPC ........................................................ 307/149
See application file for complete search history.

(56) References Cited

U.S. PATENT DOCUMENTS

| | | | |
|---|---|---|---|
| 4,626,053 A | 12/1986 | Fayfield | |
| 5,387,110 A | 2/1995 | Kantner et al. | |
| 5,484,299 A * | 1/1996 | Schlessinger | H01R 13/4532 200/51.1 |
| 6,981,887 B1 | 1/2006 | Mese et al. | |
| 8,157,575 B1 * | 4/2012 | Matsuoka | H01R 27/00 361/737 |
| 8,210,866 B2 | 7/2012 | Inage et al. | |
| 8,556,659 B1 * | 10/2013 | Rothkopf | H01R 13/64 439/620.21 |
| RE45,050 E * | 7/2014 | Terlizzi et al. | 324/538 |
| 8,806,067 B2 * | 8/2014 | Terlizzi | H01R 13/6683 710/105 |

(Continued)

FOREIGN PATENT DOCUMENTS

CN  2850066 Y  12/2006
KR  20060065658 B1  1/2008

(Continued)

OTHER PUBLICATIONS

Supplementary European Search Report, Application No. EP13854359, Date of Completion May 20, 2016, 4 pages.

(Continued)

*Primary Examiner* — Jared Fureman
*Assistant Examiner* — Esayas Yeshaw
(74) *Attorney, Agent, or Firm* — International IP Law Group, P.L.L.C.

(57) ABSTRACT

A method of receiving a plug at a receptacle is disclosed. The method may include receiving a plug at a receptacle, the receptacle including contacts disposed with a rotational symmetry about a center point of the receptacle. The method may also include determining, via detection circuitry, any orientation of the plug inserted into the receptacle. The method may also include changing, via selection control circuitry, a connection path coupled to the contacts based on the orientation of the plug.

16 Claims, 11 Drawing Sheets

(56) References Cited

U.S. PATENT DOCUMENTS

| | | |
|---|---|---|
| 2004/0087213 A1 | 5/2004 | Kao |
| 2007/0010116 A1 | 1/2007 | Teicher |
| 2008/0164934 A1 | 7/2008 | Hankey et al. |
| 2008/0167828 A1 | 7/2008 | Terlizzi et al. |
| 2008/0305676 A1* | 12/2008 | Fiennes .............. H01R 13/7031 439/489 |
| 2009/0141499 A1* | 6/2009 | Fabbri ....................... F21S 8/02 362/276 |
| 2009/0191729 A1* | 7/2009 | Kurimoto .............. H01R 13/02 439/78 |
| 2009/0215320 A1* | 8/2009 | Iranpour Feridani .. H01R 27/00 439/660 |
| 2011/0250786 A1* | 10/2011 | Reid ...................... H01R 27/02 439/488 |
| 2013/0108064 A1* | 5/2013 | Kocalar ........... G01R 31/31857 381/58 |
| 2013/0217253 A1* | 8/2013 | Golko ................. H01R 13/516 439/345 |
| 2015/0056865 A1* | 2/2015 | Guo ................... H01R 13/6658 439/660 |

FOREIGN PATENT DOCUMENTS

| | | |
|---|---|---|
| WO | 9962147 | 12/1999 |
| WO | 2009069969 A2 | 6/2009 |
| WO | 2011150403 A1 | 12/2011 |
| WO | 2011163256 A1 | 12/2011 |

OTHER PUBLICATIONS

Chinese Search Report, CN Application No. 201380054430.5, dated Sep. 20, 2016, 1 page.

* cited by examiner

500

1000

US 9,590,373 B2

PROVIDING ORIENTATION SUPPORT IN RECEPTACLES

TECHNICAL FIELD

This disclosure relates generally to methods and systems of receiving a plug at a receptacle. More specifically, the method and systems include an orientation-independent plug and receptacle.

BACKGROUND ART

Computing devices may be connected to peripheral devices or other computing devices via a cable. The cable may include a plug to be received into a receptacle of the computing device or into a receptacle of the peripheral device. Some plugs are required to be inserted in one orientation in order to communicatively couple one device to another device.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for enabling a plug to be received into the receptacle in more than one orientation. In some embodiments, the plug includes contacts to provide power from one device to another device. In some embodiments, the contacts are be configured to provide data signals from one device to another. The plug may be operably inserted into the receptacle in more than one orientation. In some embodiments, the plug may be inserted in either a first orientation or a second orientation that is flipped at a degree of rotation compared to the first orientation. The contacts of the plug and the contacts of the receptacle may be disposed with rotational symmetry to enable the contacts of the plug to mate with the contacts of the receptacle independent of the orientation of the plug or receptacle. A detection mechanism may detect the orientation of the plug and cause the signals to the contacts of the receptacle to be assigned based on the orientation. In other embodiments, an orientation detection mechanism may be included in the connector and a signaling mechanism may be included in the plug or in the connector of a peripheral device. In some embodiments, a control channel between the two devices may enable a peripheral device to communicate the logical assignment of the contacts of the peripheral device as determined by the relative orientation of the contacts.

Rotational symmetry looks identical after a certain amount of rotations/degrees. The contact pattern looks the same after the rotation.

Figure 1:
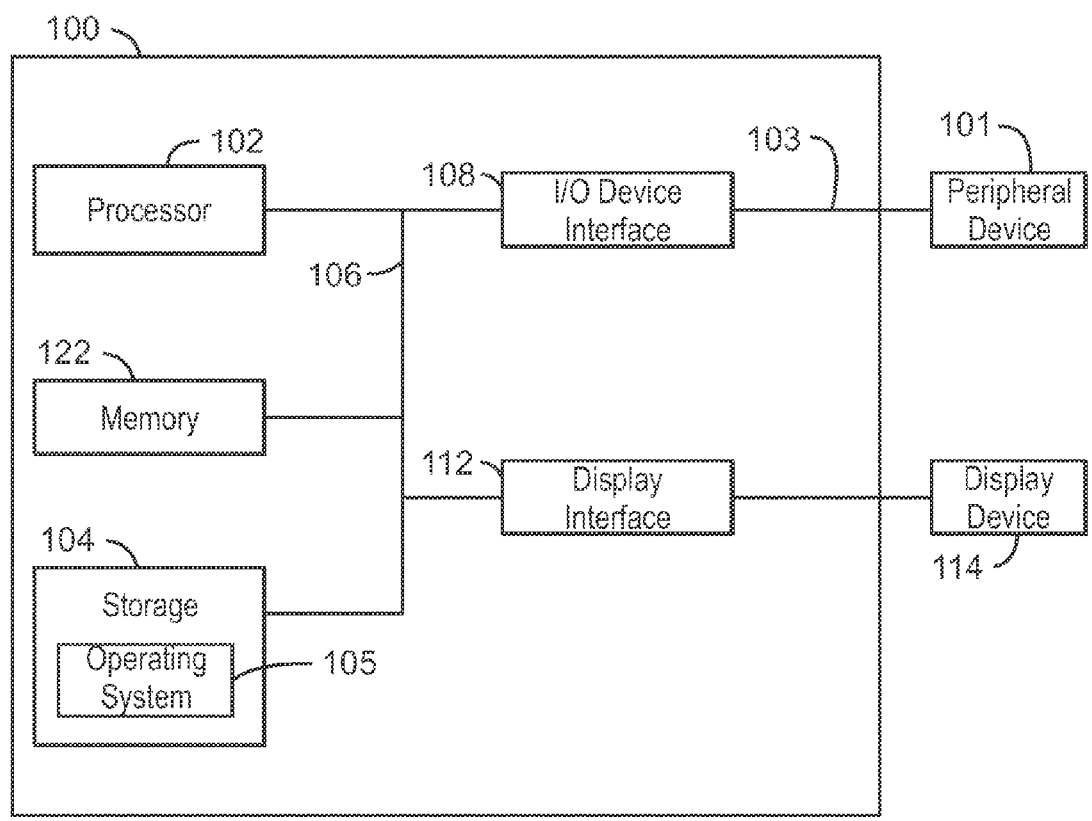
FIG. 1 is a block diagram illustrating a system including a host computing device communicatively coupled to a peripheral device via a cable.

FIG. 1 is a block diagram of system including a host computing device 100 communicatively coupled to a peripheral device 101 via a cable 103. The cable 103 may be configured to provide a signal from the host computing device 100 to the peripheral device 101. The cable 103 may include a plug (not shown) configured to be received at a receptacle (not shown) of the host computing device 100. The host computing device 100 may be, for example, a laptop computer, desktop computer, tablet computer, mobile device, server, or cellular phone, among others. The host computing device 100 may include a main processor 202 that is adapted to execute stored instructions, as well as a memory device 122 that stores instructions that are executable by the main processor 202. The main processor 202 can be a single core processor, a multi-core processor, a computing cluster, or any number of other configurations. The main processor 202 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 202 includes dual-core processor(s), dual-core mobile processors), or the like.

The memory device 122 can include random access memory (e.g., SRAM, DRAM, zero capacitor RAM, SONGS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 122 and that are executed by the main processor 202 may be used to detect the orientation of the plug of the cable 103 and route contacts of the receptacle of the host computing device 100 based on the orientation.

The main processor 202 may be connected through a system bus 106 (e.g., PCI, ISA, PCI-Express, HyperTransport®, NuBus, etc.) to an input/output (I/O) device interface 108 adapted to connect the host computing device 100 to a peripheral device 101 via the cable 103, The peripheral device 101 may include, for example, a keyboard and a pointing device, wherein the pointing device may include a touchpad or a touchscreen, a peripheral device such as a camera, a media player, a printer, among others. The peripheral device 101 may be a host computing device similar to the host computing device 100. The I/O device interface 108 may be configured to detect the orientation of the plug of the cable 103 and route contacts of the receptacle of the host computing device 100 based on the orientation.

The main processor 202 may also be linked through the system bus 106 to a display interface 112 adapted to connect the host computing device 100 to a display device 114. The display device 114 may include a display screen that is a built-in component of the host computing device 100. The display device 114 may also include a computer monitor, television, or projector, among others, that is externally connected to the host computing device 100.

The host computing device 100 may also include a storage device 204. The storage device 204 may include a physical memory such as a hard drive, an optical drive, a flash drive, an array of drives, or any combinations thereof. The storage device 204 may also include remote storage drives. The storage device 204 may also include an operating system 105. The storage device 204 may store instructions thereon to detect the orientation of the plug of the cable 103 and route contacts of the receptacle of the host computing device 100 based on the orientation.

Figure 2:
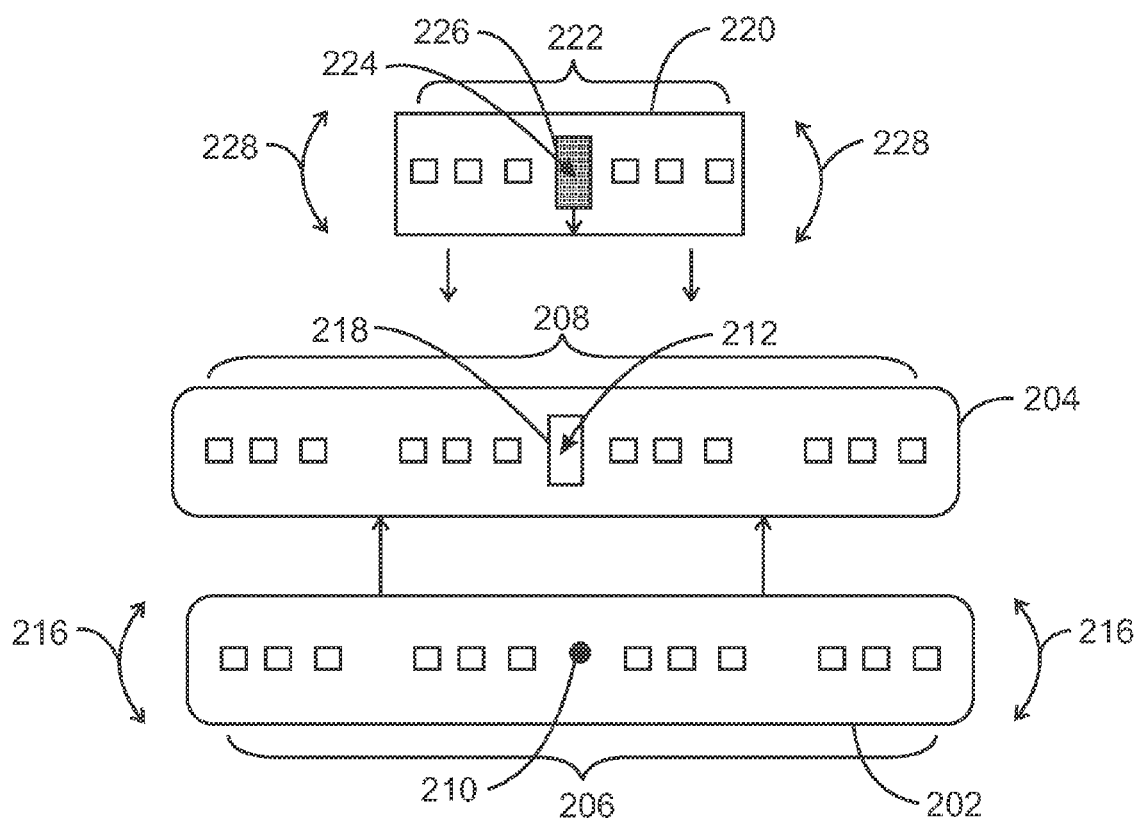
FIG. 2 is a block diagram illustrating a plug and a receptacle each with contacts disposed with rotational symmetry about a center point.

FIG. 2 is a block diagram illustrating a plug 202 and a receptacle 204 each with contacts 206, 208 disposed with rotational symmetry about a center point 210, 212. The arrows 210, 212 indicate the center point of each of the plug 202 and the receptacle 204, respectively. The center points 210, 212 may be a virtual center point without any physical representation on either the plug 202 or the receptacle. The plug 202 may include contacts 206 disposed with rotational symmetry about the center point 210. As indicated by the arrows 216 the plug 202 may be rotated or flipped. The receptacle 204 may include contacts 208 disposed with rotational symmetry about the center point 212 to receive the plug 202 in either a first orientation or a second orientation at a degree of rotation compared to the first orientation. For example, the plug 202 may be right-side-up or up-side-down when received by the receptacle 204. The contacts 206, 208 may each be configured such that the receptacle 204 may receive the plug 202 in either a right-side-up orientation, or an up-side-down orientation rotated 180 degrees compared to the right-side-up orientation. The receptacle 204 may be located at a platform housing (not shown) of a computing device, such as the computing device 100 of FIG. 1.

In some embodiments, a plug is scalable in size and number of contacts. In this embodiment, the receptacle 204 may be configured to receive a relatively smaller plug, such as the plug 220. The plug 220 may include contacts 222 disposed about a center point indicated by the arrow 224. The plug 220 may be flipped or rotated as indicated by the arrows 228. The receptacle 204 may include an alignment feature 218. In some embodiments, the alignment feature 218 may include a protrusion in line with the center point 212 of the receptacle configured to enable alignment of the plug 220 with the receptacle 204. The protrusion 218 may be received in a recess 226 of the plug 220. In other embodiments, the protrusion may be on the plug 220 and the recess may be on the receptacle 204. In either embodiment, the receptacle 204 may be configured to receive scalable plugs 202, 220 having any size equal to, or smaller than, the size of the receptacle 204. Further, the alignment feature may be a receptacle sleeve to receive a plug as discussed below with reference to FIG. 3.

Figure 3:
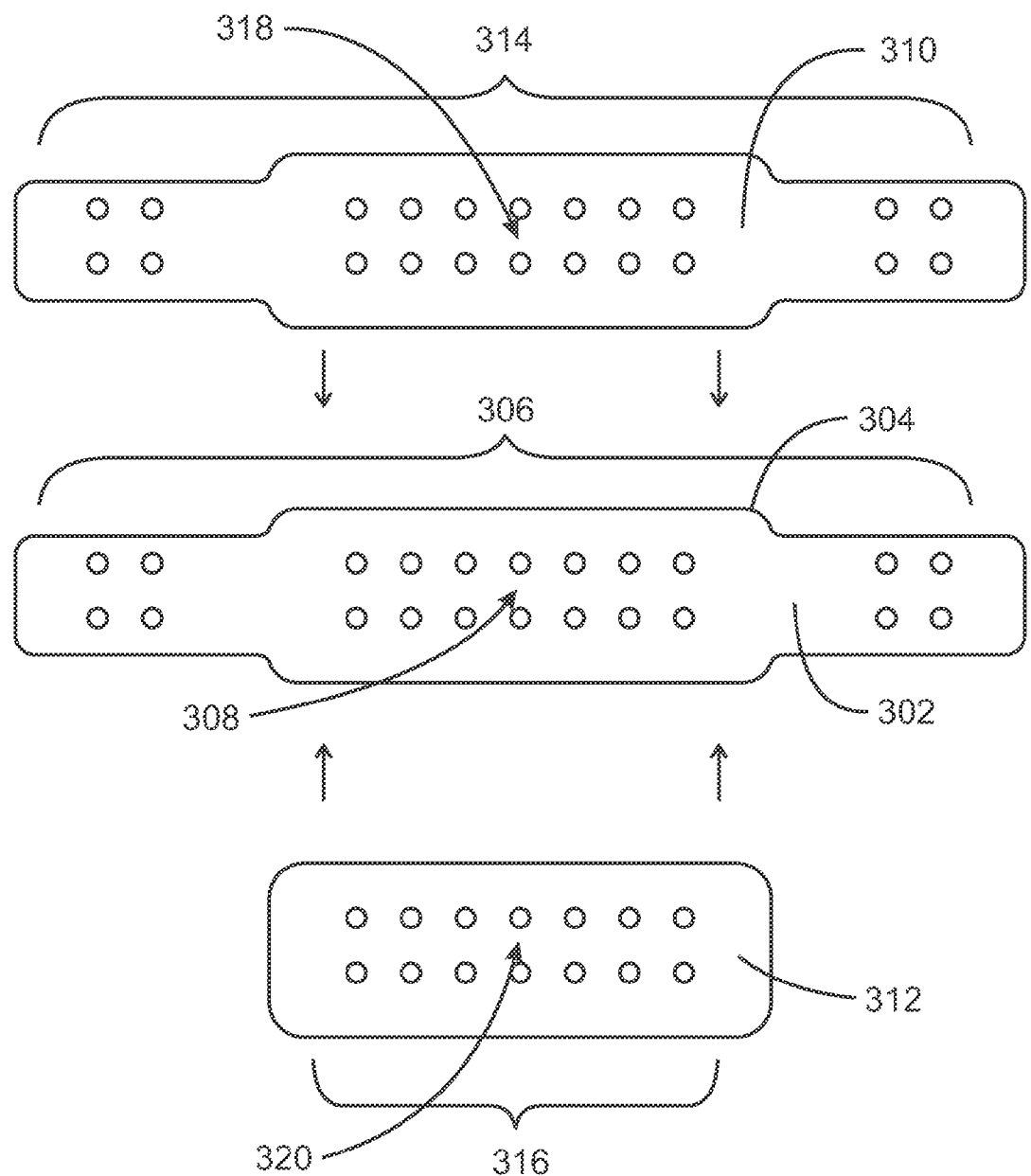
FIG. 3 is a block diagram illustrating a receptacle having a receptacle sleeve to receive a scalable plug.

FIG. 3 is a block diagram illustrating a receptacle 302 having a receptacle sleeve 304 to receive a scalable plug 310, 312. Similar to the plug 202 and receptacle 204 described in FIG. 2, the receptacle 302 may have contacts 306, disposed with rotational symmetry about a center point as indicated by the arrow 308. Likewise, each of the plugs 310, 312 may have contacts 314, 316 disposed with rotational symmetry about a center point as indicated by the arrows 318, 320. Each of the plugs 310, 312 may be rotated or flipped. The receptacle 302 may include contacts 306 disposed with rotational symmetry about the center point 308 to receive either the plug 310, or the plug 312, in either a first orientation or a second orientation at a degree of rotation compared to the first orientation. In some embodiments, the plug 312 may be relatively smaller than the receptacle 302. The receptacle 302 may include a receptacle sleeve 304 configured to receive either the plug 312 or the plug 310. The receptacle sleeve 304 is a shape of the receptacle opening configured to enable to receive a plug of scalable size such as either plug 310, or plug 312.

Figure 4:
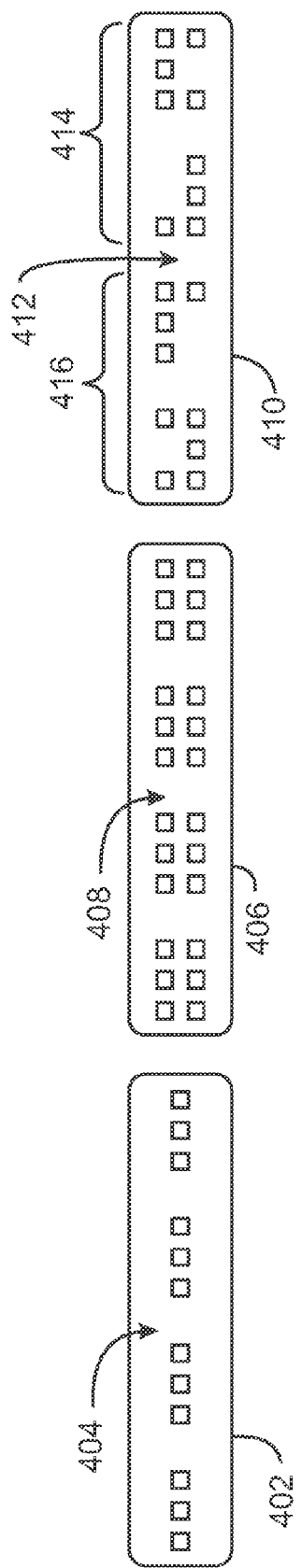
FIG. 4 is a block diagram illustrating embodiments of contacts disposed with rotational symmetry.

FIG. 4 is a block diagram illustrating embodiments of contacts disposed with rotational symmetry. The contacts illustrated in FIG. 4 may be implemented on a plug and receptacle. As illustrated in FIG. 4, the particular arrangement of contacts on one side of the center point, indicated by the arrows 404, 408, 412, may be variable as long as the arrangement of contacts on the opposite side of the center point 404, 408, 412, reflect a degree of rotation of the contacts on the original side of the center point 404, 408, 412. For example, the arrangement of contacts 402, where each of the contacts 402 is disposed directly adjacent to each other from left to right on each side of the center point 404, reflect a 180 degree rotation of the contacts 402 on the left side of the center point 404. The arrangement of contacts 406 illustrates a similar example where the contacts 406 are aligned with symmetry about the center point 408. The arrangement of contacts 410 is not directly symmetrical about the center point 412 but the left side 414 of the contacts 410 reflects a 180 degree rotation of the contacts 410 on the right side 416 relative to the center point 412. The rotational symmetry may enable a host computing system, such as the host computing system 100 of FIG. 1, to identify various power signals and data signals in either the first orientation position or the second orientation position.

Figure 5:
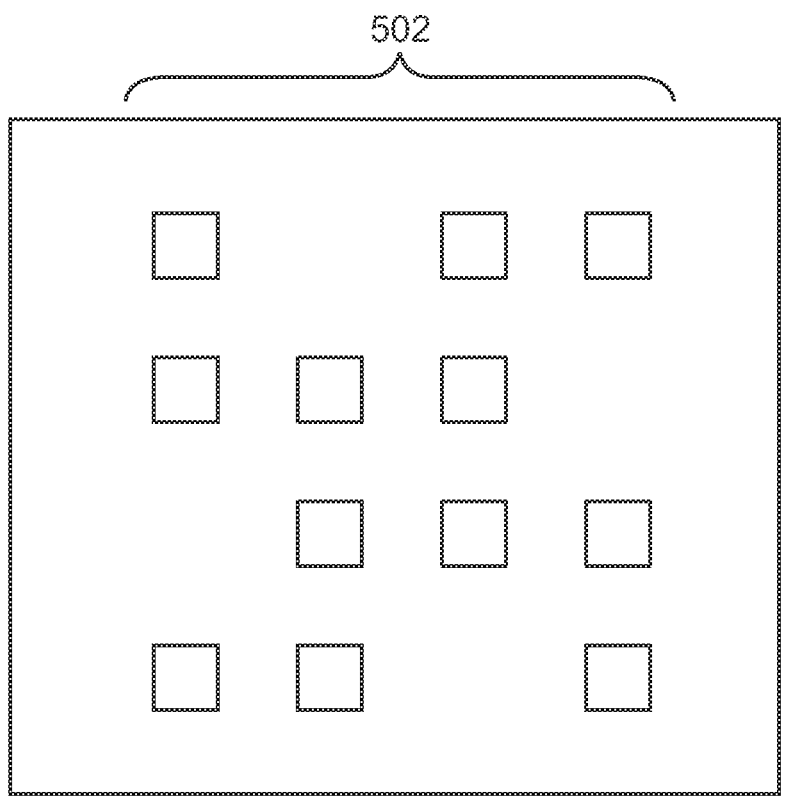
FIG. 5 is a block diagram illustrating contacts disposed with rotational symmetry.

FIG. 5 is a block diagram illustrating contacts 502 disposed with rotational symmetry. In contrast to FIG. 4 where the contacts are disposed with a rotational symmetry of 180 degrees, FIG. 5 illustrates contacts 502 disposed with rotational symmetry of 90 degrees. The contacts 502 may be disposed with rotational symmetry on a plug or a receptacle. When rotated from a first orientation to a second orientation 90 degrees from the first orientation the contacts are arranged in a pattern that is identical to the arrangement of contacts in the first orientation.

Figure 6:
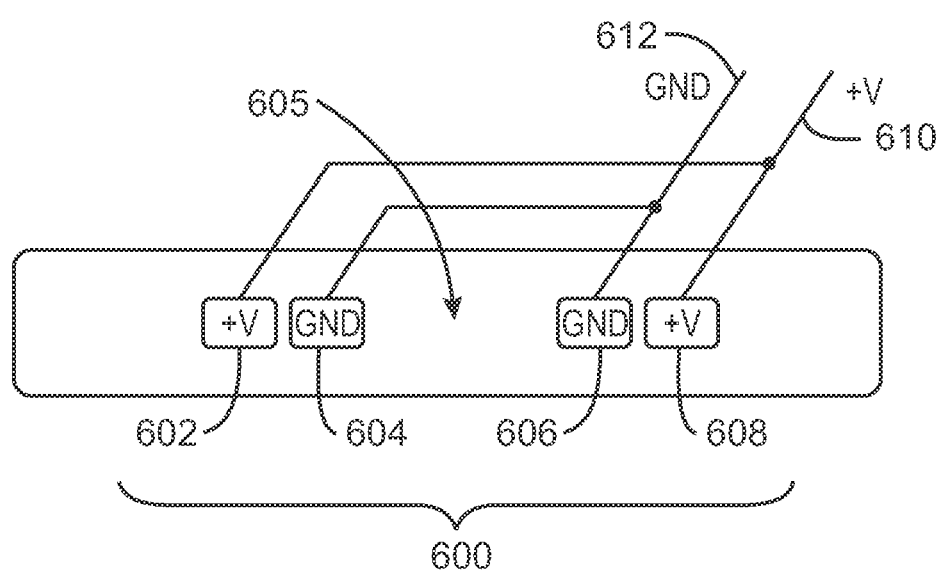
FIG. 6 is a block diagram illustrating an embodiment of contacts disposed with rotational symmetry communicatively coupled to voltage and ground lines.

FIG. 6 is a block diagram illustrating an embodiment of contacts 600 disposed with rotational symmetry communicatively coupled to voltage 610 and ground lines 612. The contacts 600 are arranged in a single inline manner wherein each of the contacts 600 are adjacent to each other on a respective side of a center point as indicated by the arrow 605. The contacts 602, 608 are communicatively coupled to the voltage line 610 configured to provide power between a first device and a second device. The contacts 604, 606 are communicatively coupled to the ground line 612. Thus, the contacts 602, 604, 606, 608 are arranged to allow a plug to be received at a receptacle in either the first orientation or the second orientation at a degree of rotation compared to the first orientation.

Figure 7:
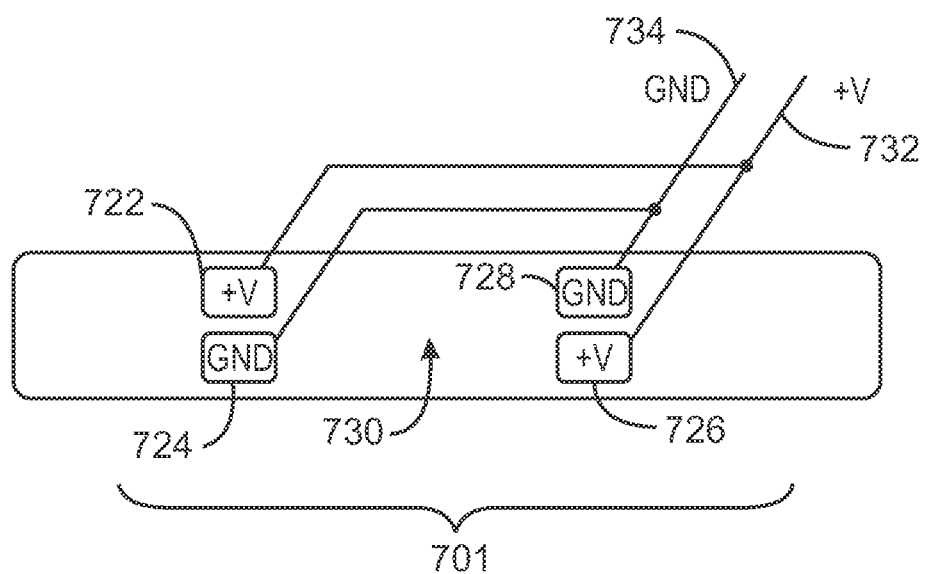
FIG. 7 illustrates an embodiment wherein the contacts arranged in a dual inline manner.

FIG. 7 illustrates an embodiment wherein the contacts 701 are arranged in a dual inline manner. The contact 722 is disposed above contact 724, and the contact 726 is disposed below the contact 728. The contacts 722, 726 are communicatively coupled to a voltage line 732 configured to provide power between a first device and a second device. The contacts 724, 728 are communicatively coupled to a ground line 734. In this embodiment, the contacts 701 enable rotation of a plug to be received by a receptacle due to the rotational symmetry of the contacts 701 about a center point 730.

Figure 8A:
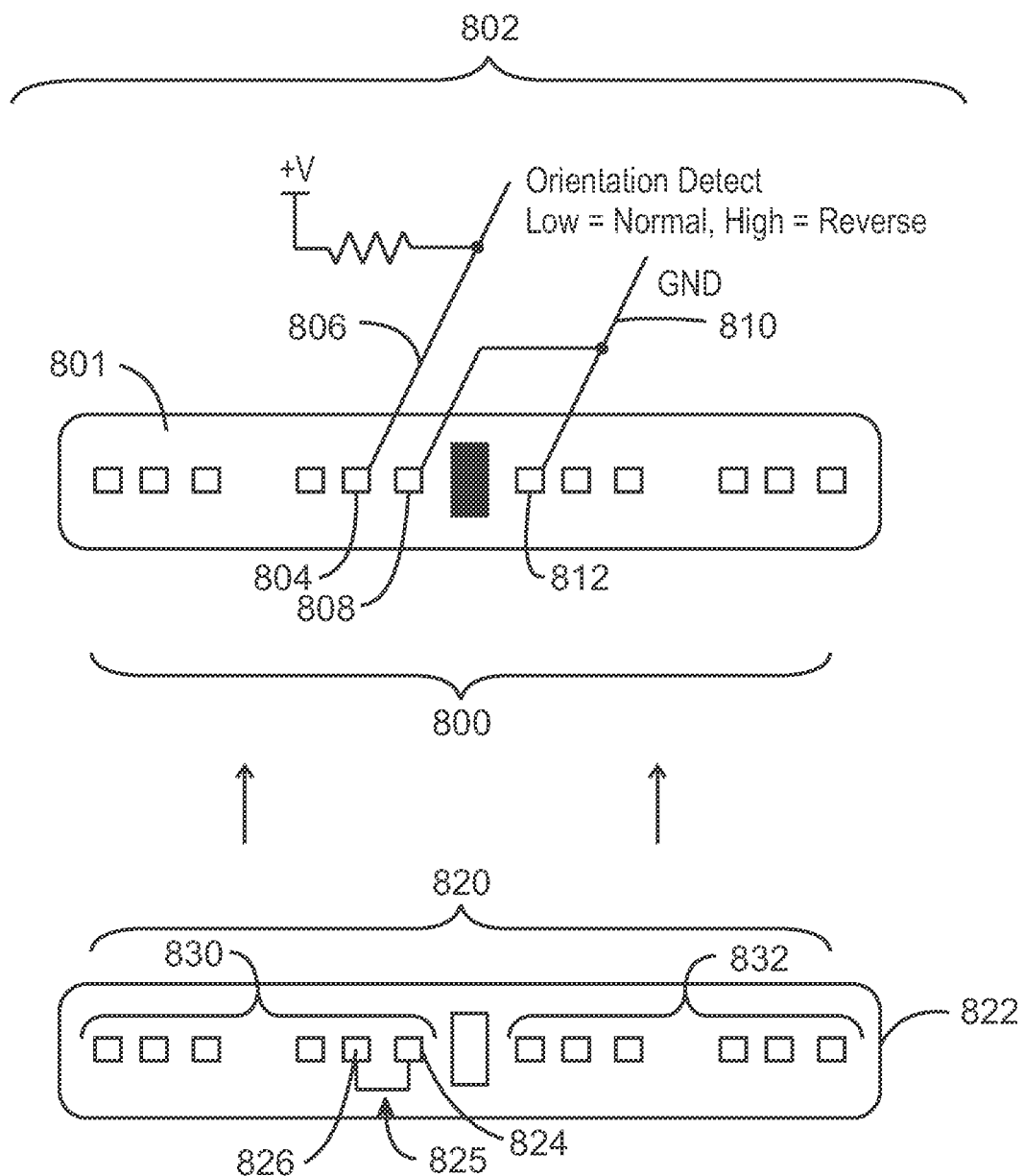
FIG. 8A is a block diagram illustrating an embodiment of contacts of a receptacle disposed with rotational symmetry wherein one or more of the contacts connected to a detection circuitry.

FIG. 8A is a block diagram illustrating an embodiment of contacts 800 of a receptacle 801 disposed with rotational symmetry wherein one or more of the contacts connected to a detection circuitry 802. The detection circuitry 802 may be configured to determine whether the plug is inserted in the first orientation or the second orientation. The detection circuitry 802 may be configured to receive a ground signal by a signaling mechanism in plug 822 configured to ground voltage applied to one of the contacts of the receptacle 801. In FIG. 8A, the plug 822 is illustrated in the first orientation. In this embodiment, a first contact 804 of the receptacle 801 may have voltage applied from a host computing device (not shown) to the first contact 804. The contacts 808, 812 may be connected to a ground line 810 configured to receive a ground via the plug 822. The plug 822 may include a second contact 824 being grounded and configured to ground the voltage applied to the first contact 804. For example, the contacts 820 of the plug 822 are disposed with rotational symmetry are received by the contacts 800 of the receptacle 801 in the first orientation. The contact 824 and the contact 826 may be coupled by a strapping mechanism 825 such as a wire or resistor to provide a DC path, or a capacitor to provide an AC path. When the plug 822 is received by the receptacle 801 voltage provided to the contact 804 is received by the contact 826 and the voltage is grounded by the ground signal connected to the contact 824. When the voltage applied to the contact 804 is grounded by the contact 824 the detection circuitry 802 may be configured to indicate that the plug 822 is received by the receptacle 801 in the first orientation. In embodiments, the detection circuitry 802 is configured to receive the plug 822 in the second orientation at a degree of rotation compared to the first orientation.

Figure 8B:
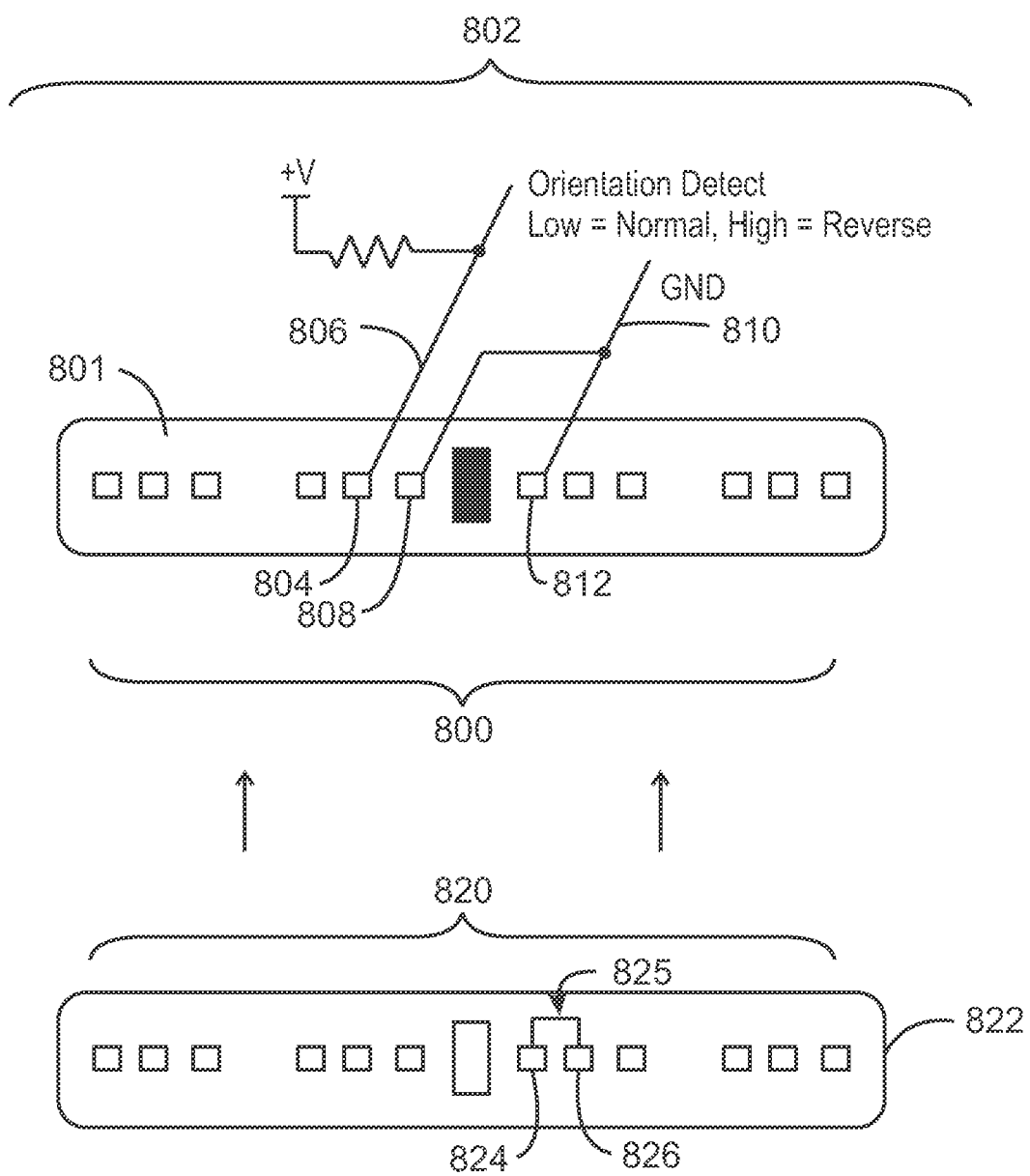
FIG. 8B is a block diagram illustrating an embodiment of contacts of the plug disposed with rotational symmetry in a second orientation.

FIG. 8B is a block diagram illustrating an embodiment of contacts 820 of the plug 822 disposed with rotational symmetry in a second orientation. The detection circuitry 802 will not receive a ground signal by the signaling mechanism in plug 822 in the second orientation. In the second orientation, the receptacle 801 may receive the plug at a degree of rotation, such as 180 degrees rotated with respect to the first orientation. The voltage applied to the contact 804 is not grounded by the contact 826 because the plug has been rotated 180 degrees with respect to the first orientation. Therefore, while the contact 824 may be communicatively coupled to the contact 812 of the receptacle, the voltage applied to the contact 804 of the receptacle is not grounded. When the voltage applied to the contact 804 of the receptacle is not grounded, the detection circuitry 802 may indicate that the plug 822 is being received at the receptacle 801 in the second orientation at a degree of rotation compared to the first orientation.

In some embodiments, the grounding may be done at a remotely connected device such as the peripheral device 101 of FIG. 1. In this embodiment, the detection circuitry 802 may be configured to monitor the states of contacts on the detecting end resulting in a logical table as follows: High-High=disconnected, Low-High=connected in the first orientation, and High-Low=connected in the second orientation.

In some embodiments, the contacts 820 of the plug 822 may be comprised of a first set of contacts 830 and a second set of contacts 832 on opposite sides of the center point 810. The first set of contacts 830 may be mapped to first interface protocol and the second set of contacts 832 may be mapped to a second interface protocol identical to the first interface protocol. In this embodiment, the receptacle 801 may receive the plug 822 in either orientation, and determining the orientation may facilitate determining one or more lane mappings for each of the first interface protocol and the second interface protocol with respect to the first set of contacts 830 and the second set of contacts 832. For example, the first set of contacts 830 may be mapped to a first USB interface protocol, and the second set of contacts 832 may be mapped to a second USB interface protocol. The detection circuitry 802 may facilitate selection control circuitry, discussed in more detail below, to change connection paths and assign lanes associated with the first and second USB interface protocols to the first set of contacts 830 and the second set of contacts 832, respectively. As another example, the first set of contacts 830 may be mapped to a first PCIe protocol, and the second set of contacts 832 may be mapped to a second PCIe protocol. The selection control circuitry, described in more detail below, may assign lanes associated with the first and second PCIe protocols to the first set of contacts 830 and the second set of contacts 832, respectively.

In some embodiments, one or more of the contacts are active when the contacts are all being used for power transmission and when there are functionally similar contacts on an opposite side. For example, a first contact may be connected to a voltage source and a second contact, disposed on the opposite side of the center point, may also be connected to a voltage source. When the plug is received at the receptacle, both of the first and second contact may be active because they are rotationally symmetric with respect to one another, as well as functionally identical. However, in an alternative embodiment, the contacts are used for data transmission, in which case not all of the contacts are required to be active so long as the connection between the plug and the receptacle do not cause any functional issues during the period prior to the detection of orientation. For example, at least one of the contacts may be used for data transmission. The contact used for data transmission may remain inactive until orientation is detected and connection paths have been selected.

Figure 9:
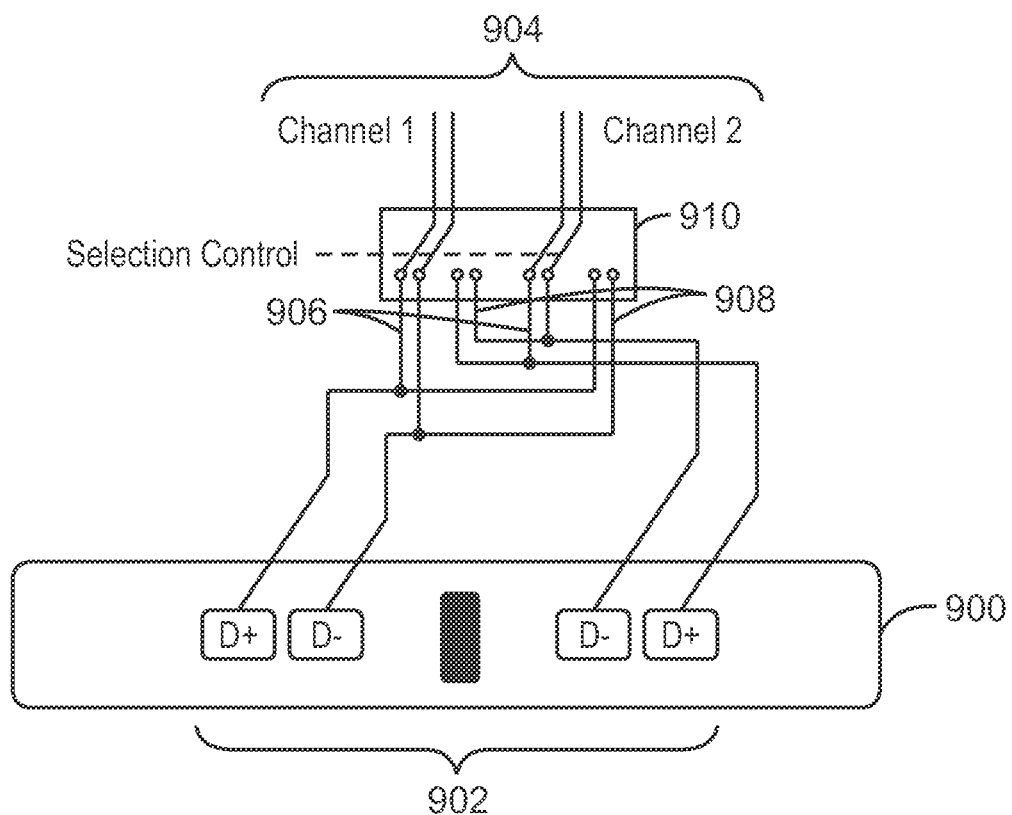
FIG. 9 illustrates an embodiment of contacts of a plug disposed with rotational symmetry, wherein the contacts are connected to a selection control circuitry.

FIG. 9 illustrates an embodiment of contacts 902 of a plug 900 disposed with rotational symmetry, wherein the contacts 902 are connected to a selection control circuitry 904. The selection control circuitry 904 is configured to change a connection path coupled to the contacts 902 based on whether the plug (not shown) is inserted in the first orientation or the second orientation. The selection control circuitry 904 may include a first connection path 906 communicatively coupled to the contacts 902 in the first orientation. The selection control circuitry 904 may include a second connection path 908 communicatively coupled to the contacts 902 in the second orientation. The selection control circuitry 904 may include a switch 910 to change between the first and second connection paths based on the orientation determined by the determination circuitry.

Figure 10:
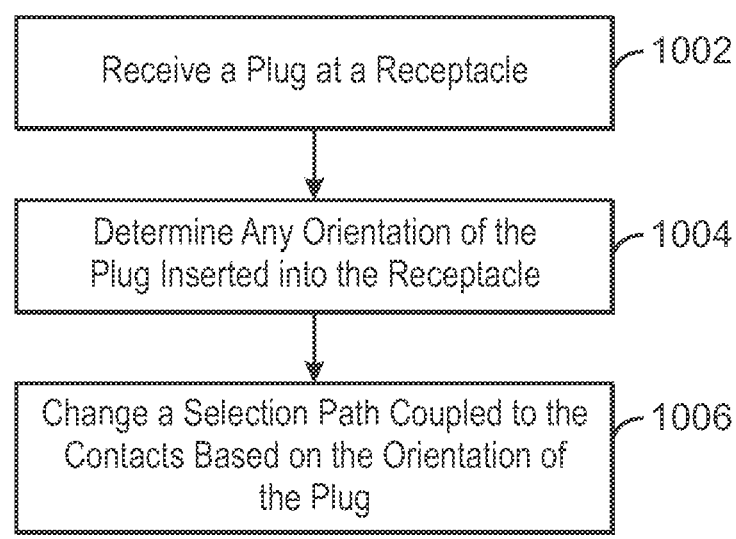
FIG. 10 illustrates a block diagram of a method for receiving a plug in either a first orientation or a second orientation.

FIG. 10 illustrates a block diagram of a method 1000 for receiving a plug in either a first orientation or a second orientation. The method 1000 may include receiving 1002 a plug at a receptacle, the receptacle including contacts disposed with a rotational symmetry about a center point of the receptacle. The plug may include contacts disposed with rotational symmetry about a center point of the plug.

The method 1000 may also include determining 1004, via detection circuitry, any orientation of the plug inserted into the receptacle. The method 1000 may also include changing, via selection control circuitry, a connection path coupled to the contacts based on the orientation of the plug. The plug may be received in either a first orientation or a second orientation. The difference between the first orientation and the second orientation may be a degree of rotation from the first orientation to the second orientation.

The receptacle may be communicatively coupled to a host computing device. The method 1000 may further include applying, via the host computing device, voltage to a first contact of the receptacle. The method may also include grounding second contact of the plug to ground the voltage applied to the first contact when the plug is in the first orientation. The method 1000 may also include determining the voltage applied to the first contact is grounded by the second contact to indicate the plug is inserted in the first orientation. The method 1000 may also include determining the voltage applied to the first contact is not grounded by the second contact to indicate that the plug is inserted in the second orientation.

In some embodiments, the voltage applied to the first contact is grounded at a peripheral device. In this embodiment, voltage is applied to a third contact as well as the first contact. The third contact may be disposed on the opposite side of the center point relative to the first contact. The detection circuitry may indicate that the receptacle is not connected to the plug when neither of the first contact nor the second contact is grounded. The detection circuitry may indicate that the plug is connected to the receptacle in the first orientation when the first contact is grounded but the second contact is not grounded. The detection circuitry may also indicate that the plug is connected to the receptacle in the second orientation when the third contact is grounded but the first contact is not grounded.

The method 1000 may also include communicatively coupling, via the selection control circuitry, a first connection path to the contacts. The method 1000 may also include communicatively coupling, via the selection control circuitry, a second connection path to the contacts. The method 1000 may also include changing, via a switch of the selection control circuitry, between the first and second the connection paths based on the orientation determined by the determination circuitry.

In some embodiments, the plug may also be aligned with the receptacle. Therefore, the method 1000 may include aligning the plug with the receptacle via a protrusion positioned in line with the center point. In some embodiments, the plug has fewer contacts than the receptacle. Therefore, the method 1000 may include the aligning the plug with the receptacle via a receptacle sleeve to receive the plug by receiving at least some of contacts of the plug.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present technique. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A receptacle communicatively coupled to a host computing device comprising:
   contacts disposed with a rotational symmetry about a center point of the receptacle, wherein the contacts receive a plug in one of a first orientation and a second orientation at a degree of rotation compared to the first orientation;
   detection circuitry to determine an orientation of the plug inserted into the receptacle, wherein the detection circuitry comprises:
      a first contact of the receptacle having voltage applied from the host computing device to the first contact; and
      a second contact of the plug being grounded to ground the voltage applied to the first contact; and
   selection control circuitry to change a connection path coupled to the contacts based on the orientation of the plug.

2. The receptacle of claim 1, wherein the plug includes contacts disposed with rotational symmetry about a center point of the plug.

3. The receptacle of claim 1, wherein the detection circuitry is to:
   determine the voltage applied to the first contact is grounded by the second contact to indicate the plug is inserted in the first orientation; and determine the voltage applied to the first contact is not grounded by the second contact to indicate the plug is inserted in the second orientation.

4. The receptacle of claim 1, further comprising an alignment feature comprising one or more of:
a protrusion at the receptacle positioned in line with the center point to enable alignment of the plug;
a protrusion at the plug positioned in line with the center point to enable alignment of the receptacle; and
a receptacle sleeve to receive the plug by receiving at least some of contacts of the plug.

5. The receptacle of claim 1, wherein:
one or more of the contacts are active when the one or more contacts are being used for power transmission and when there are functionally similar contacts on an opposite side; and
at least one of the contacts is used for data transmission and remains inactive until orientation is detected and connection paths have been selected.

6. The receptacle of claim 1, wherein the selection control circuitry comprises:
a first connection path communicatively coupled to the contacts;
a second connection path communicatively coupled to the contacts; and
a switch to change between the first and second the connection paths based on the orientation determined by the determination circuitry.

7. A system comprising:
a plug including contacts disposed with rotational symmetry about a center point of the plug;
a receptacle including contacts disposed with rotational symmetry about a center point of the receptacle, wherein a host computing device is to communicatively couple to the receptacle and the contacts of the receptacle receive the contacts of the plug in one of a first orientation and a second orientation at a degree of rotation compared to the first orientation;
detection circuitry to determine an orientation of the plug inserted into the receptacle, wherein the detection circuitry comprises:
a first contact of the receptacle including voltage applied from the host computing device to the first contact; and
a second contact of the plug being grounded to ground the voltage applied to the first contact; and
selection control circuitry to change a connection path coupled to the contacts based on the orientation of the plug.

8. The system of claim 7, wherein the detection circuitry is to:
determine the voltage applied to the first contact is grounded by the second contact to indicate the plug is inserted in the first orientation; and
determine the voltage applied to the first contact is not grounded by the second contact to indicate the plug is inserted in the second orientation.

9. The system of claim 7, further comprising an alignment feature comprising one or more of:
a protrusion of the receptacle positioned in line with the center point of the plug to enable alignment of the plug;
a protrusion of the plug positioned in line with the center point of the receptacle to enable alignment of the receptacle; and
a receptacle sleeve to receive the plug by receiving at least some of contacts of the plug.

10. The system of claim 7, wherein:
one or more of the contacts are active when the one or more contacts are being used for power transmission and when there are functionally similar contacts on an opposite side; and
at least one of the contacts is used for data transmission and remains inactive until orientation is detected and connection paths have been selected.

11. The system of claim 7, wherein the selection control circuitry comprises:
a first connection path communicatively coupled to the contacts;
a second connection path communicatively coupled to the contacts; and
a switch to change between the first and second the connection paths based on the orientation determined by the determination circuitry.

12. A method comprising:
receiving a plug at a receptacle in one of a first orientation and a second orientation at a degree of rotation compared to the first orientation, wherein the receptacle includes contacts disposed with a rotational symmetry about a center point of the receptacle and the receptacle is communicatively coupled to a host computing device;
determining, via detection circuitry, any orientation of the plug inserted into the receptacle;
changing, via selection control circuitry, a connection path coupled to the contacts based on the orientation of the plug, and
applying, via the host computing device, voltage to a first contact of the receptacle; and
grounding a second contact of the plug to ground the voltage applied to the first contact when the plug is in the first orientation.

13. The method of claim 12, wherein the plug includes contacts disposed with rotational symmetry about a center point of the plug.

14. The method of claim 12, further comprising:
determining the voltage applied to the first contact is grounded by the second contact to indicate the plug is inserted in the first orientation; and
determining the voltage applied to the first contact is not grounded by the second contact to indicate the plug is inserted in the second orientation.

15. The method of claim 12, further comprising one or more of:
aligning the plug with the receptacle via a protrusion at the receptacle positioned in line with the center point;
aligning the receptacle with the plug via a protrusion at the plug positioned in line with the center point of the receptacle; and
aligning the plug with the receptacle via a receptacle sleeve to receive the plug by receiving at least some of contacts of the plug.

16. The method of claim 12, further comprising:
communicatively coupling, via the selection control circuitry, a first connection path to the contacts;
communicatively coupling, via the selection control circuitry, a second connection path to the contacts; and
changing, via a switch of the selection control circuitry, between the first and second the connection paths based on the orientation determined by the determination circuitry.

* * * * *